J. W. BONHAM.
LAWN MOWER.
APPLICATION FILED AUG. 23, 1911.
1,042,880.
Patented Oct. 29, 1912.
3 SHEETS—SHEET 2.
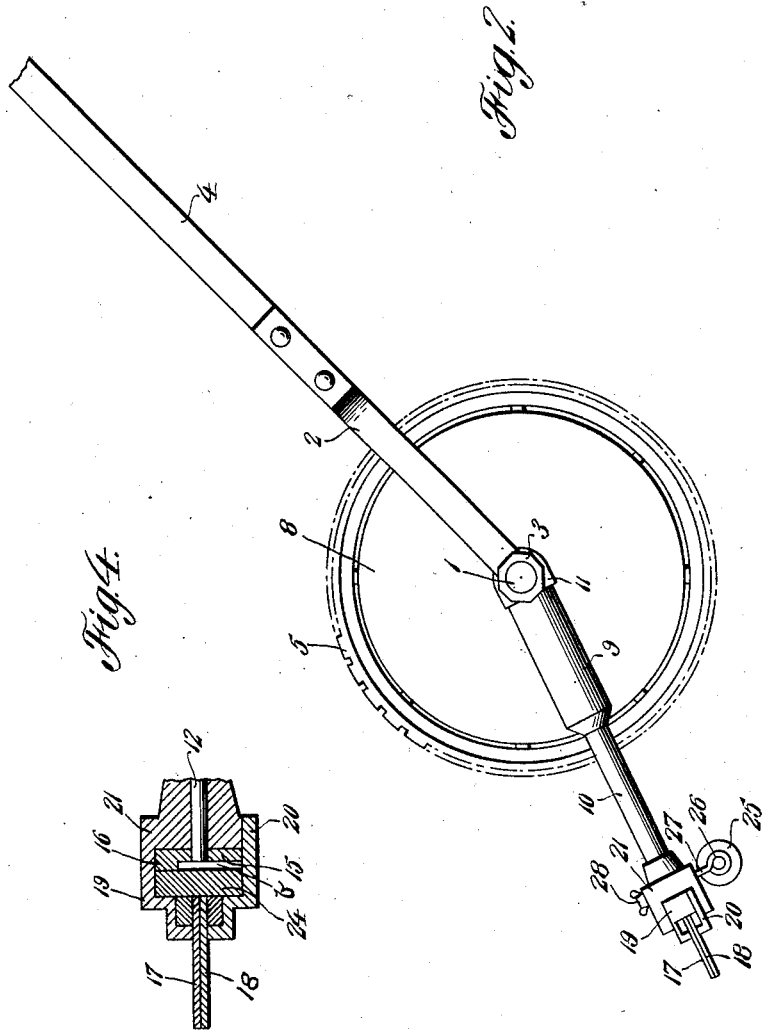
Witnesses
J. H. Crawford
V. B. Hillyard.
Inventor
James W. Bonham,
By Victor J. Evans
Attorney J. W. BONHAM.
LAWN MOWER.
APPLICATION FILED AUG. 23, 1911.
1,042,880.
Patented Oct. 29, 1912.
3 SHEETS—SHEET 3.
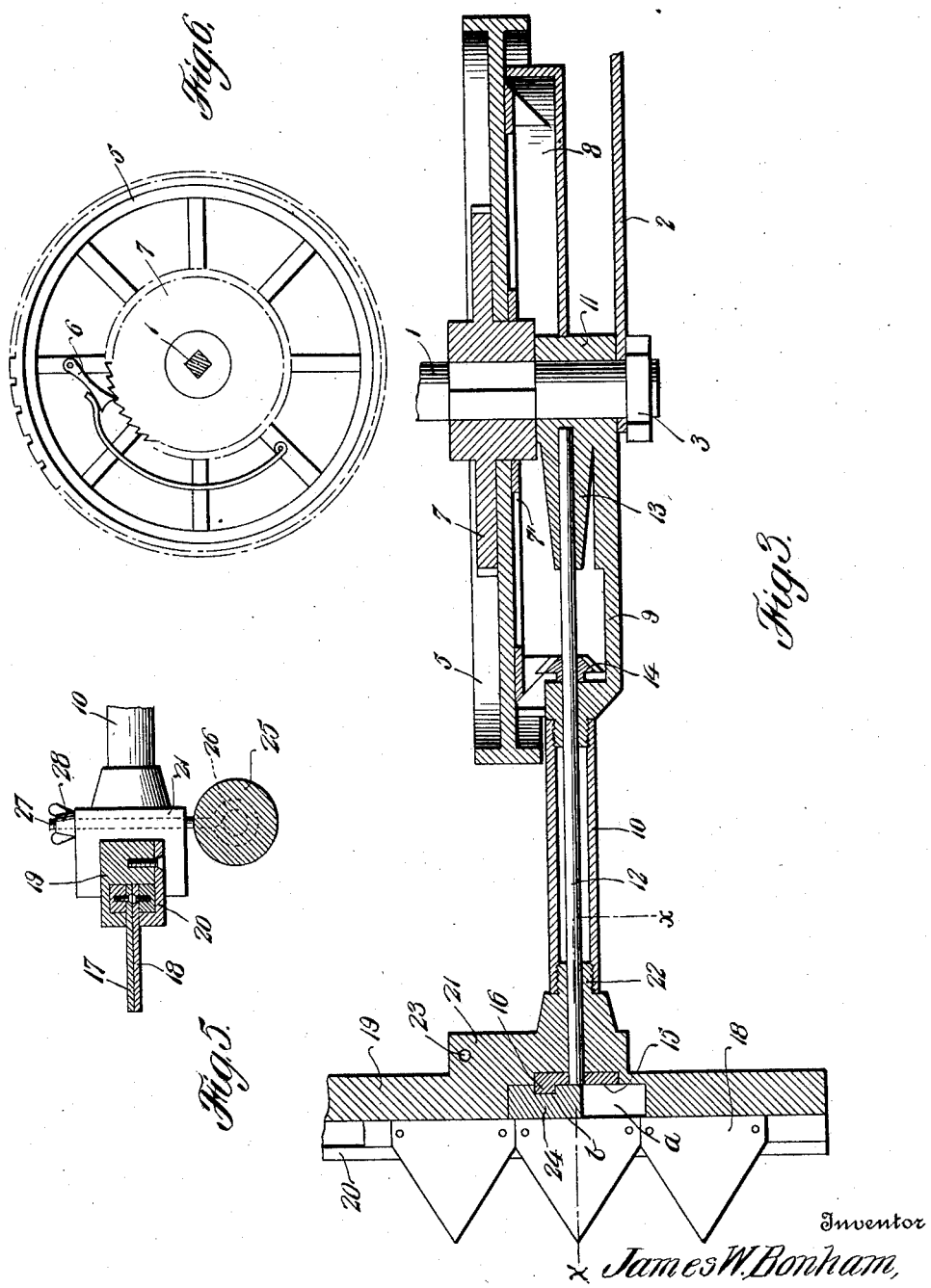
Witnesses
J. H. Crawford
V. B. Hillyard.
Inventor
James W. Bonham,
By Victor J. Evans
Attorney

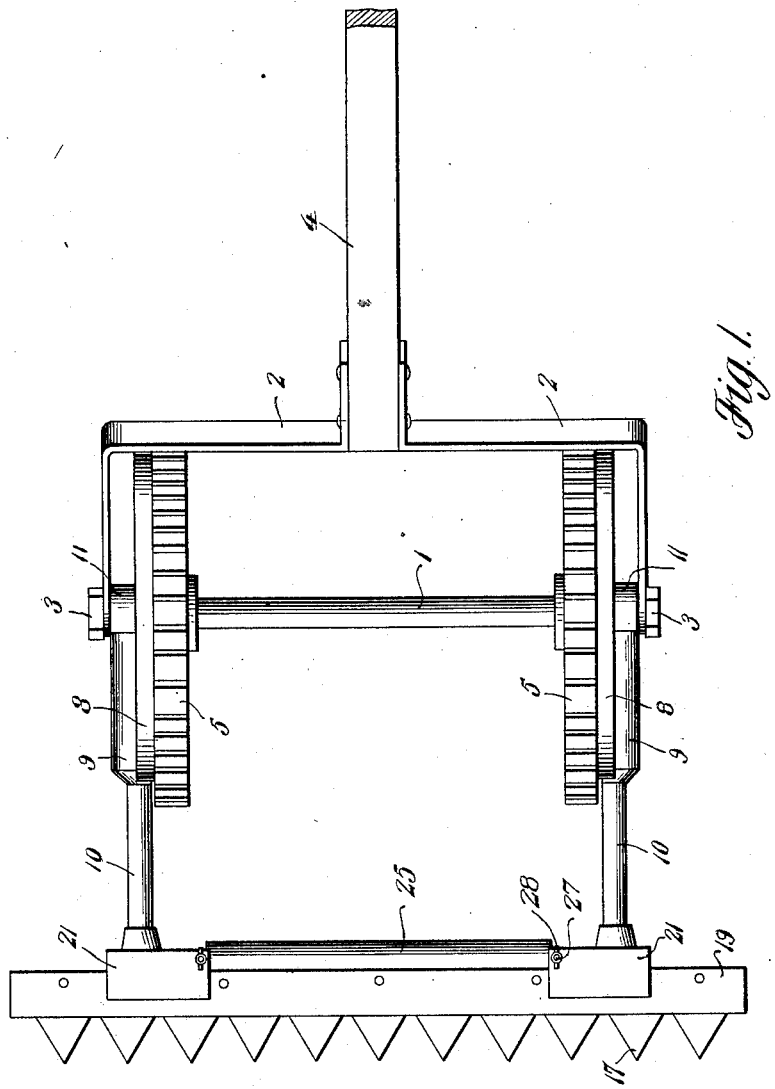

UNITED STATES PATENT OFFICE.

JAMES W. BONHAM, OF MANHATTAN, KANSAS.

LAWN-MOWER.

1,042,880.  Specification of Letters Patent.  Patented Oct. 29, 1912.

Application filed August 23, 1911. Serial No. 645,502.

*To all whom it may concern:*

Be it known that I, JAMES W. BONHAM, a citizen of the United States, residing at Manhattan, in the county of Riley and State of Kansas, have invented new and useful Improvements in Lawn-Mowers, of which the following is a specification.

The present invention relates to mowing apparatus and more particularly to the type of machines designed for mowing lawns and generally constructed to be operated by hand.

The purpose of the invention is the provision of a machine embodying two sickle bars mounted to have an independent movement imparted thereto and separate driving mechanism for each sickle bar, each driving mechanism embodying a traction wheel upon which the machine is mounted so as to roll over the lawn.

The invention relates most especially to the mounting of the sickle bars and the connecting means between the sickle bar mounting and the axle, including the means whereby the power is transmitted from each traction wheel to the respective sickle bar.

The invention consists of the novel features, details of construction and combination of parts, which hereinafter will be more particularly set forth, illustrated in the accompanying drawings, and pointed out in the appended claim.

Referring to the drawings, forming a part of the specification, Figure 1 is a top plan view of a lawn mower embodying the invention. Fig. 2 is a side view of the machine. Fig. 3 is a horizontal section of a traction wheel and the parts intimately associated therewith, including an end portion of the cutting mechanism, the parts being illustrated on a larger scale. Fig. 4 is a section on the line $x$—$x$ of Fig. 3. Fig. 5 is a cross section of the sickle bars and mounting. Fig. 6 is a detail view, showing the means whereby power is applied to each of the sickle bars for reciprocating the same.

Corresponding and like parts are referred to in the following description, and indicated in all the views of the drawings, by the same reference characters.

The lawn mower embodies an axle 1 to which are fitted strap irons 2, the same being retained in place by means of nuts 3. A handle bar 4 is secured between the upper ends of the strap irons 2. A traction wheel 5 is loosely mounted upon each end of the axle and is provided with a spring pressed pawl 6, which is adapted to engage with the teeth of a ratchet wheel 7 secured to the axle so as to rotate therewith. The axle has a portion near each end made square or angular to fit within an opening of corresponding shape formed in the ratchet wheel to cause the latter to turn with the axle. The ratchet wheel has a hub upon an end portion of which the traction wheel is mounted. A bevel gear wheel 7′ is mounted upon the outer end portion of the hub and is fastened thereto in any manner so as to rotate with the ratchet wheel. It is to be understood that opposite end portions of the axle are similarly constructed and are provided with corresponding elements. A cap 8 incloses the ratchet wheel, pawl and spring.

An arm is connected with each end of the axle and comprises a frame 9 and a sleeve 10, the two being connected by means of a screwthread joint. A box 11 is provided at one end of the arm to receive the axle. A shaft 12 passes through the sleeve 10 and is mounted in bearings at opposite ends of the frame 9, a cone 13 being had at the upper end of each shaft 12 which is mounted in a bearing formed at the juncture of the frame 9 and box 11. A bevel pinion 14 is fastened to the shaft 12 and meshes with the teeth of the bevel gear wheel 7. The lower end of each shaft 12 has a crank wheel 15 whose crank pin 16 is adapted to impart a reciprocating movement to the sickle bar arranged to operate therewith.

The sickle bars 17 and 18 are of like formation, each consisting of a bar provided with cutters secured thereto in any manner. The sickle bars are arranged to reciprocate in opposition one upon the other and are mounted in a housing embodying an upper bar 19 and a lower bar 20, the two bars being secured together in any manner and adapted to receive the bar members of the sickle bars so as to hold them in proper relation and to give direction thereto when the machine is in operation. The two-part housing 19 and 20 has a casting 21 near each end, said casting forming a bearing for the lower end of the shaft 12 and having a threaded projection 22 and a vertical opening 23. The lower or outer end of the sleeve 10 is threaded to the projection 22 of the casting 21. Each sickle bar has a vertical extension 24 in which is formed a vertical groove to receive the crank pin 16 by means of which a reciprocating movement is imparted to the sickle bar when the machine is in operation. A roller 25 is located below the housing of the sickle bars and is mounted in eyes 26 at the lower ends of stems 27 which are supported in the openings 23 of the castings 21, set screws 28 serving to secure the stems 27 in the adjusted position.

It is noted that each of the sickle bars is positively driven and by having the traction wheels loosely mounted upon the axle one may rotate faster than the other when making a curve or deviating from a straight course. The sickle bars may be easily removed from their housing by separating the parts 19 and 20, the vertical extensions 24 having the grooves in which the crank pins 16 are entered admitting of the sickle bars being easily removed and quickly replaced. The vertical adjustment of the roller 25 admits of cutting the grass any length. The construction is such as to admit of ready assemblage of the parts and of access being had thereto for any purpose.

Each of the castings 21 has a recess $a$ in its front side to receive the extension 24, said recess being of a width to admit of the lateral movement of the part 24. The crank pin 16 enters the vertical groove $b$ and when the shaft 12 is rotated the crank pin 16 operating in the groove $b$ causes the part 24 to reciprocate laterally in the recess $a$ of the part 21. A shaft 12 is had for each sickle bar. The shafts 12 are located at the sides of the machine exterior to the traction wheels and, being geared thereto in the manner specified, are caused to rotate in opposite directions, hence the sickle bars are reciprocated in opposition when the machine is in action.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention what is claimed as new, is:—

In a mowing machine, the combination of a cutting mechanism, a housing supporting the cutting mechanism, an axle, arms connecting the axle with the housing, each of the arms consisting of a frame and a sleeve, the latter making screwthread connection with the frame and with the aforesaid housing, gear wheels mounted in line with the axle, traction wheels loose upon the axle, a ratchet connection between each of the traction wheels and the gear wheels, shafts mounted in said arms, a gear connection between each of the shafts and each of the said gear wheels, two sickle bars arranged to operate in opposition, and connecting means between the shafts and the sickle bars.

In testimony whereof I affix my signature in presence of two witnesses.

JAMES W. BONHAM.

Witnesses:
HENRY OTTO,
W. R. WEST.

---

Copies of this patent may be obtained for five cents each, by addressing the "Commissioner of Patents, Washington, D. C."